United States Patent
Alvarez-Alvarez et al.

(10) Patent No.: US 12,331,216 B2
(45) Date of Patent: Jun. 17, 2025

(54) COATED METALLIC SUBSTRATE

(71) Applicant: ArcelorMittal, Luxembourg (LU)

(72) Inventors: Abel Alvarez-Alvarez, Asturias (ES); Oscar Perez Vidal, Asturias (ES); Carlos Javier Rodriguez Martinez, Asturias (ES); David Noriega Perez, Asturias (ES); Jose Paulino Fernandez Alvarez, Asturias (ES)

(73) Assignee: ArcelorMittal, Schaan (LI)

( * ) Notice: Subject to any disclaimer, the term of this patent is extended or adjusted under 35 U.S.C. 154(b) by 1048 days.

(21) Appl. No.: 17/058,087

(22) PCT Filed: Jun. 11, 2019

(86) PCT No.: PCT/IB2019/054846
§ 371 (c)(1),
(2) Date: Nov. 23, 2020

(87) PCT Pub. No.: WO2019/239304
PCT Pub. Date: Dec. 19, 2019

(65) Prior Publication Data
US 2021/0139712 A1    May 13, 2021

(30) Foreign Application Priority Data
Jun. 15, 2018   (WO) .................. PCT/IB2018/054428

(51) Int. Cl.
*C09D 5/00*   (2006.01)
*B05D 7/00*   (2006.01)
(Continued)

(52) U.S. Cl.
CPC ............. *C09D 5/002* (2013.01); *B05D 7/542* (2013.01); *C09D 7/62* (2018.01); *C09D 7/69* (2018.01);
(Continued)

(58) Field of Classification Search
CPC .......... C09D 5/002; C09D 7/542; C09D 7/69; C09D 133/12; C09D 163/00; B05D 7/542; G01B 7/18
See application file for complete search history.

(56) References Cited

U.S. PATENT DOCUMENTS 6,648,552 B1   11/2003   Smith et al.
2014/0291733 A1   10/2014   Lee et al.
(Continued)

FOREIGN PATENT DOCUMENTS

CN   107488267 A   12/2017
IN   201641031777 A   9/2016
(Continued)

OTHER PUBLICATIONS

Lindsay Ballard (NPL title: How to paint perfect stripes on textured walls, Retrieved from the Internet: <URL: https://makelyhome.com/paint-perfect-stripes/>. (Year: 2011).*
(Continued)

*Primary Examiner* — Hai Y Zhang
(74) *Attorney, Agent, or Firm* — Davidson Kappel LLC

(57) ABSTRACT

A metallic substrate directly coated with a non-conductive primer, the non-conductive primer being at least partially coated with a paint, a method for the manufacture of this coated metallic substrate, a method for detecting strain deformation and the use the coated metallic substrate.

27 Claims, 1 Drawing Sheet

(51) Int. Cl.
*C09D 7/40* (2018.01)
*C09D 7/62* (2018.01)
*C09D 133/12* (2006.01)
*C09D 163/00* (2006.01)
*G01B 7/16* (2006.01)

(52) U.S. Cl.
CPC ......... *C09D 133/12* (2013.01); *C09D 163/00* (2013.01); *G01B 7/18* (2013.01)

(56) References Cited

U.S. PATENT DOCUMENTS

| | | | |
|---|---|---|---|
| 2015/0218392 A1* | 8/2015 | Crain | C09D 7/62 252/511 |
| 2015/0344701 A1 | 12/2015 | Kim et al. | |
| 2016/0060120 A1 | 3/2016 | Hu et al. | |
| 2016/0272575 A1 | 9/2016 | Zheng et al. | |
| 2017/0138804 A1 | 5/2017 | Lebental et al. | |

FOREIGN PATENT DOCUMENTS

| | | |
|---|---|---|
| JP | 2010005838 A | 1/2010 |
| JP | 2013035966 A | 2/2013 |
| JP | 2015040211 A | 3/2015 |
| JP | 2016507404 A | 3/2016 |
| JP | 2016120704 A | 7/2016 |
| JP | 2017512747 A | 5/2017 |
| JP | 2017119846 A | 7/2017 |
| JP | 2017141444 A | 8/2017 |
| JP | 2017178979 A | 10/2017 |
| KR | 20170071678 | 6/2017 |
| WO | WO2009/123771 | 10/2009 |
| WO | WO2017039350 A1 | 3/2017 |
| WO | WO2017/132734 | 8/2017 |
| WO | WO2017/177269 | 10/2017 |
| WO | WO2018/178845 | 10/2018 |
| WO | WO2019/220177 A1 | 11/2019 |
| WO | WO2019/224579 A1 | 11/2019 |
| WO | WO2019/239302 A1 | 12/2019 |

OTHER PUBLICATIONS

Khan et al. (NPL titled: Reduction mechanism of graphene oxide including various parameters affecting the C/O ratio, Materials Today Communications 36 (2023) 106577, attached). (Year: 2023).*
International Search Report of PCT/IB2019/054846, dated Sep. 17, 2019.

* cited by examiner

COATED METALLIC SUBSTRATE

The present invention relates to a metallic substrate directly coated with a non-conductive primer, the non-conductive primer being at least partially coated with a paint comprising reduced graphene oxide and a thermosetting polymer, a method for the manufacture of this coated metallic substrate, a method for detecting strain deformation. It is particularly well suited for the offshore industry, electronic industry and energy industry.

BACKGROUND

Very sensitive strain sensing devices are greatly needed for monitoring a state of a structure, such as an expressway, a building, a bridge, an airplane, a ship, or the like, or for early detecting of a defect that occurs in an extreme situation such as a natural disaster such as earthquake, typhoon, or the like. Therefore, piezoelectric elements are being researched.

However, most of piezoelectric elements are fragile ceramic materials, and are difficult to be used as a flexible strain sensor. A special manufacturing process is mainly needed for forming a piezoelectric element on a flexible substrate.

The patent application US20140291733 discloses a strain sensing device comprising: a flexible substrate; a gate electrode formed on the flexible substrate; a gate insulating layer configured to cover the gate electrode, and include a part formed of a flexible material; an active layer formed of reduced graphene oxide (R-GO) for sensing a strain, on the gate insulating layer; and a source and drain electrode formed on the active layer.

However, this device is really complex to produce on an industrial scale since it comprises a lot of elements. Moreover, this device can be applied to a flexible or elastic electronic device. Nevertheless, it is not adapted to metallic substrate such as steel. Indeed, for example in the energy and offshore industries, there is a need to monitor the strain deformation of a wind turbine for early detection of defects or critical situations such as cracks (especially important in welded areas), pitting corrosion, very high loads that could be avoided by wind turbine or blades positioning control, etc. and therefore to increase the lifetime of the wind turbine. Finally, in the method of forming the active layer of reduced graphene oxide, graphene oxide is adsorbed onto a gate insulating layer, by using a graphene oxide aqueous solution (0.2 mg/mL) of a graphene oxide nanosheet formed by a graphite striping Hummer method. An adsorbed and networked graphene oxide layer is exposed to hydrazine hydrate vapor at about 40° C. for 18 hours to thereby be reduced, thereby forming an R-GO layer that is the active layer. However, the formation of reduced graphene oxide is very long and the absorption technique can lead to adherence problem and decrease the quality of the strain detection.

SUMMARY OF THE INVENTION

It is an object of the present invention to provide an easy system to detect and monitor strain deformation of metallic substrates. Additionally, it is an alternate or additional object to provide a system having a high detection sensitivity and therefore improve the life time of metallic substrates.

The present invention provides a metallic substrate directly coated with a non-conductive primer, the non-conductive primer being at least partially coated on at least one side with a paint comprising reduced graphene oxide and a thermosetting polymer.

The invention also covers a method for the manufacture of the coated metallic substrate.

The invention also covers a method for detecting a strain deformation with the coated metallic substrate.

Finally, the invention covers the use of the coated metallic substrate.

The following terms is defined:

Reduced graphene oxide means graphene oxide that has been reduced. The reduced graphene oxide comprises one or a few layer(s) of graphene having some oxygen functional groups including ketone groups, carboxyl groups, epoxy groups and hydroxyl groups and Biopolymers are polymers produced by living organisms; in other words, they are polymeric biomolecules. Biopolymers contain monomeric units that are covalently bonded to form larger structures.

BRIEF DESCRIPTION OF THE DRAWINGS

Other characteristics and advantages of the invention will become apparent from the following detailed description of the invention.

To illustrate the invention, various embodiments and trials of non-limiting examples will be described, particularly with reference to the following Figures.

DETAILED DESCRIPTION

The invention relates to a metallic substrate directly coated with a non-conductive primer, the non-conductive primer being at least partially coated on at least one side with a paint comprising reduced graphene oxide and a thermosetting polymer.

Without willing to be bound by any theory, it seems that the paint including the reduced graphene oxide and the thermosetting polymer well adheres on the non-conductive primer increasing the lifetime of the coated metallic substrate and very importantly, the loading transfer to the sensor. Indeed, it is believed the reduced graphene oxide is highly dispersed in the paint leading to an improvement of the detection quality. Finally, the paint deposited on the non-conductive primer is an easy and simple system allowing a quick detection of strain deformation.

The reduced graphene oxide can be produced from kish graphite as disclosed in the patent applications PCT/IB2017/000348 published as WO2018/178845 A or PCT/IB2018/053416 published as WO2019/220177 A1. It can also be produced from electrode scraps as disclosed in PCT/IB2018/053643 published as WO2019/224579 A1.

Preferably, the non-conductive primer is coated on both sides.

In a preferred embodiment, the coated metallic substrate is covered by a protective layer. The protective layer can be made of thermosetting polymers. In this case, the coated non-conductive substrate is protected against corrosion, etc.

Preferably, the lateral size of the reduced graphene oxide is between 1 and 80 µm, more preferably between 40 and 80 µm and advantageously between 60 and 80 µm.

Preferably, the weight percentage of oxygen in the reduced graphene oxide is between 2 and 20% and preferably between 2 and 10%. Indeed, without willing to be bound by any theory, it is believed that the percentage of oxygen plays a role in the conductivity and electrical resistance of the paint.

Preferably, the reduced graphene oxide is not functionalized by a biopolymer. Indeed, without willing to be bound by any theory, it is believed that the biopolymer can decrease the sensitivity of the strain deformation detection.

Figure 1:
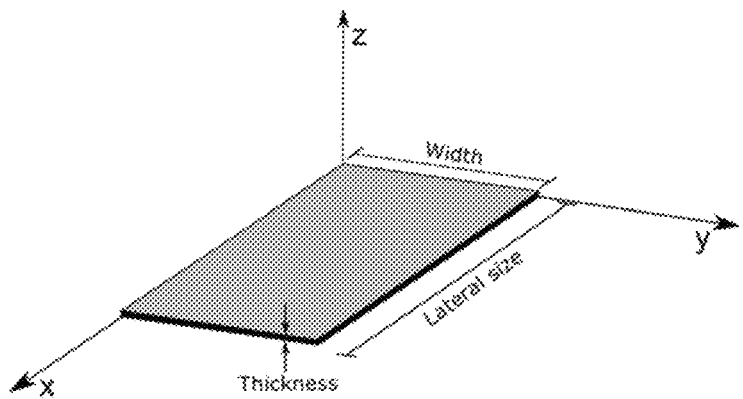
FIG. 1 illustrates an example of one nanoplatelet of reduced graphene oxide according to the present invention.
Figure 2:
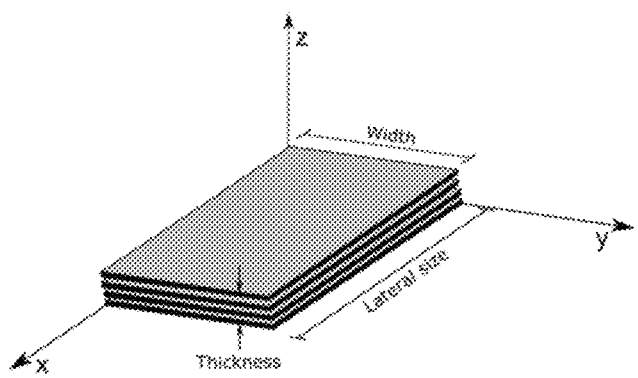
FIG. 2 illustrates an example of a few nanoplatelets of reduced graphene oxide according to the present invention.

Preferably, the reduced graphene oxide is in a form of one or more nanoplatelets. Indeed, without willing to be bound by any theory, it is believed that the form of the reduced graphene oxide can play a role in the detection since it seems that the nanoplatelets can easily form a path in the paint wherein the electricity runs. FIG. 1 illustrates an example of one nanoplatelet of reduced graphene oxide. The lateral size means the highest length of the layer through the X axis, the thickness means the height of the layer through the Z axis and the width of the nanoplatelet is illustrated through the Y axis. FIG. 2 illustrates an example of a few nanoplatelets of reduced graphene oxide.

Preferably, the reduced graphene oxide has a surface area below 300 $m^2 \cdot gr^{-1}$ and more preferably below 290 $m^2 \cdot gr^{-1}$. Preferably, the reduced graphene oxide has a surface area above 200 $m^2 \cdot gr^{-1}$. When the surface area is equal or above to 300 $m^2 \cdot gr^{-1}$, it seems that the quality of the leak detection of non-conductive substrates decreases since the paint is too sensitive and therefore, background noise is also detected.

Advantageously, the thickness of the paint is below 1 mm and preferably between 25 and 500 microns.

Preferably, the concentration of the reduced graphene oxide in the paint is between 0.05 and 10% by weight, preferably between 0.05 and 7% by weight and advantageously between 0.5 and 4% by weight. Indeed, without willing to be bound by any theory, it seems that having the reduced graphene oxide in the above concentration further improves the detection sensitivity in the case of strain because in that range the conductivity of the network of nanoparticles formed inside the thermosetting resin is more sensitive to deformations allowing to detect smaller strains.

Preferably, the paint does not comprise a thermoplastic polymer. In particular, the paint does not comprise acrylic polymer. Indeed, it is believed that the thermoplastic improves the viscosity of the paint leading to a bad dispersion of reduced graphene oxide and therefore a poor quality of the coated metallic substrate.

Advantageously, the thermosetting polymer is chosen from among: epoxy resin, Polyester resin, Polyurethanes, Polyurea/polyurethane, Vulcanized rubber, Urea-formaldehyde, Melamine resin, Benzoxazines, Polyimides, Bismaleimides, Cyanate esters, polycyanurates, Furan, Silicone resins, Thiolyte and Vinyl ester resins or a mixture thereof.

Preferably, the molar mass distribution of the polymer is below or equal to 1300 and advantageously between 700 and 1200.

Preferably, the non-conductive primer is made of polymers.

In a preferred embodiment, the polymer is chosen from among: Poly(methyl methacrylate), epoxy resin, Polyester resin, Polyurethanes, Polyurea/polyurethane, Vulcanized rubber, Urea-formaldehyde, Melamine resin, Benzoxazines, Polyim ides, Bismaleim ides, Cyanate esters, polycyanurates, Furan, Silicone resins, Thiolyte and Vinyl ester resins or a mixture thereof.

Preferably, the non-conductive primer does not comprise Poly-4-vinylphenol, polyethersulfone or Polydimethylsiloxane. Indeed, without willing to be bound by any theory, it is believed that the presence of these polymers can reduce the detection sensitivity.

Preferably, the metallic substrate is chosen from: aluminum, steel, stainless steel, copper, iron, copper alloys, titanium, cobalt, metal composite or nickel or a mixture thereof.

Advantageously, the paint does not comprise titanium dioxide or copper.

Preferably, the non-conductive primer is coated with paint strips to form an alternation between painted and non-painted non-conductive primer.

In another embodiment, the non-conductive primer is coated with one entire layer of paint.

The second object of the present invention is a method for the manufacture of the metallic substrate according to the present invention, comprising the successive following steps:

A. deposition of a non-conductive primer on a metallic substrate,
B. deposition of a mixture comprising reduced graphene oxide, a thermosetting monomer, a curing agent and optionally a solvent on said non-conductive primer being previously deposited on said metallic substrate and
C. a curing step.

Preferably, in step B), the mixing is performed as follows:
i. mixing of reduced graphene oxide and a thermosetting base polymer and optionally a solvent,
ii. addition of a curing agent,
iii. mixing of the mixture obtained in step B).

Preferably, in step A), the deposition of the non-conductive primer is performed by: spin coating, spray coating, dip coating, film coater, coil coating, brush coating or spatula coating.

Preferably, in step B), the solvent is chosen from among others: xylene, n-butanol, ethylbenzene, naphtha solvents, n-butyl acetate, toluene, cyclic hydrocarbons, isopropanol and benzyl alcohol or a mixture thereof.

Preferably, in step B), the thermosetting monomer is chosen from: epoxy resin, ester, urethane, urea/polyurethane, Vulcanized rubber, Urea-formaldehyde, Melamine resin, Benzoxazines, imides, Bismaleim ides, Cyanate esters, cyanurates, Furan, Silicone resins, Thiolyte and Vinyl ester resins or a mixture thereof.

Advantageously, in step B), the curing agent is chosen from among: polyamide, polyamide, phenols, amines and polyaddition isocyanate or a mixture thereof.

Preferably, in step B), the deposition of the coating is performed by spin coating, spray coating, dip coating, film coater, coil coating, brush coating or spatula coating.

Preferably, in step C), the curing step is performed by drying at room temperature.

The present invention also can provide a method for detecting a strain deformation with the coated metallic substrate according to the present invention comprising the following successive steps:

1. application of electrical voltage to the metallic substrate directly coated with a non-conductive primer, the non-conductive primer being at least partially coated with a paint using an electronic system,
2. measurement of the electrical resistance variation after deformations of the metallic substrate directly coated with a non-conductive primer, the non-conductive primer being at least partially coated with a paint.

Without willing to be bound by any theory, it is believed that in the paint, the reduced graphene oxide nanoparticles form a conductive network. When the material is subjected to a strain, the internal geometry of the network, which is stronger than the thermosetting, changes in an important way. The consequence is a change in the electrical resistance of the paint.

In this case, preferably, the gauge factor, being the ratio of relative change in electrical resistance to the mechanical strain ε, is above 5.

Preferably, in step 1), the electronic system comprises a power supply system. Preferably, it is a battery.

Finally, the present invention also can provide the metallic substrate directly coated with a non-conductive primer, the non-conductive primer being at least partially coated with a paint according to the present invention for detecting strain deformation.

The invention will now be explained in trials carried out for information only. They are not limiting.

EXAMPLES

Example 1: Conductivity Test

Steel substrates, having the following chemical composition in weight percent: 0.0670% C, 0.4910% Mn, 0.0220% Cu, 0.0110% Si, 0.0100% S, 0.0110% P, 0.0180% Ni, 0.0180% Cr, 0.0480% Nb were coated with Epoxy thermosetting resin having a molar mass distribution between 700 and 1200, bisphenol A-(epichlorhydrin) epoxy resin having a molar mass distribution below or equal to 700 and xylene.

Different nanoparticles were mixed with an epoxy resin having a molar mass distribution between 700 and 1200, bisphenol A-(epichlorhydrin) epoxy resin having a molar mass distribution below or equal to 700 and xylene. The mixture was mixed and dispersed using a device called DISPERMAT. Then, a curing agent comprising polyamide was added in the mixture before being mixed. The mixture was deposited on poly(methylmethacrylate) (PMMA).

Then, an electric voltage (10V) was applied on all the trials using an electronic system including a battery. The electrical resistance was determined. The surface area was measured by Brunauer-Emmett-Teller (BET). The conductivity of all Trials was calculated.

| Trials | Nature | Nanoparticles Oxygen content (wt %) | Nanoparticles Lateral size (µm) | Nanoparticles Surface area ($m^2$/gr) | Concentration in the paint (wt. %) | Sheet Resistance ($\Omega$/sq) | Minimum Conductivity (S/m) |
|---|---|---|---|---|---|---|---|
| 1* | Reduced Graphene oxide (rGO) | Between 2 and 2.5 | Around 70 | 287 | 0.5 | $2.7 \times 10^6$ | $3.7 \times 10^{-3}$ |
| 2* | rGO | Between 2 and 2.5 | Around 70 | 287 | 0.75 | $6.7 \times 10^4$ | $1.5 \times 10^{-1}$ |
| 3* | rGO | Between 2 and 8 | Around 70 | 287 | 0.5 | $3.6 \times 10^8$ | $2.8 \times 10^{-5}$ |
| 4* | rGO | Between 2 and 10 | Around 30 | 287 | 0.6 | $4.8 \times 10^{10}$ | $2.1 \times 10^{-7}$ |
| 5 | graphene | <2 | >5 | — | 0.5 | $>10^{12}$ | $<1 \times 10^{-8}$ |
| 6 | graphene | <2 | >5 | — | 0.75 | $>10^{12}$ | $<1 \times 10^{-8}$ |

The results are in the following Table 1:
*according to the present invention.

Trials 1 to 4 show a high conductivity and therefore a high sensitivity for detecting leak and strain deformation compared to Trials 5 and 6.

Example 2: Strain Deformation Test

Steel substrates, having the following chemical composition in weight percent: 0.0670% C, 0.4910% Mn, 0.0220% Cu, 0.0110% Si, 0.0100% S, 0.0110% P, 0.0180% Ni, 0.0180% Cr, 0.0480% Nb were coated with Epoxy thermosetting resin having a molar mass distribution between 700 and 1200, bisphenol A-(epichlorhydrin) epoxy resin having a molar mass distribution below or equal to 700 and xylene.

Different nanoparticles were mixed with an epoxy resin having a molar mass distribution between 700 and 1200, bisphenol A-(epichlorhydrin) epoxy resin having a molar mass distribution below or equal to 700 and xylene. The mixture was mixed and dispersed using a device called DISPERMAT. Then, a curing agent comprising polyamide was added in the mixture before being mixed. The mixture was deposited on the same non-conductive primer than Example 1.

Then, a tensile loading was applied on all the Trials and the gauge factor, being the ratio of relative change in electrical resistance to the mechanical strain ε, was determined. A conventional strain gauge sensitivity being made of Constantan® was added in comparison.

The results are in the following Table 2:

| Trials | Nature | Nanoparticles Oxygen content (wt %) | Nanoparticles Lateral size (µm) | Nanoparticles Surface area ($m^2$/gr) | Concentration in the paint (wt. %) | Strain (%) | Gauge factor |
|---|---|---|---|---|---|---|---|
| 7* | rGO | Between 2 and 2.5 | Around 70 | 287 | 0.6 | 0.04 | 6 |
| 8* | rGO | Between 2 and 2.5 | Around 70 | 287 | 0.6 | 0.08 | 8 |

-continued

| Trials | Nature | Nanoparticles Oxygen content (wt %) | Lateral size (μm) | Surface area (m²/gr) | Nanoparticles Concentration in the paint (wt. %) | Strain (%) | Gauge factor |
|---|---|---|---|---|---|---|---|
| 9* | rGO | Between 2 and 2.5 | Around 70 | 287 | 0.6 | 0.12 | 9.8 |
| 10* | rGO | Between 2 and 2.5 | Around 70 | 287 | 0.6 | 0.14 | 10.2 |
| 12 | conventional strain gauge | — | — | — | — | 0.04 | 2 |
| 13 | conventional strain gauge | — | — | — | — | 0.08 | 2 |
| 14 | conventional strain gauge | — | — | — | — | 0.12 | 2 |
| 15 | conventional strain gauge | — | — | — | — | 0.14 | 2 |

*according to the present invention.

Trials 7 to 10 show a high gauge factor and therefore a high sensitivity to detect the strain deformation compared to conventional strain gauge.

What is claimed is:

1. A coated metallic substrate comprising: a metallic substrate directly coated with a non-conductive primer, the non-conductive primer being at least partially coated on at least one side with a paint including reduced graphene oxide and a thermosetting polymer, the reduced graphene having ketone groups, carboxyl groups, epoxy groups and hydroxyl groups.

2. The coated metallic substrate as recited in claim 1 wherein a lateral size of the reduced graphene oxide is between 1 and 80 μm.

3. The coated metallic substrate as recited in claim 1 wherein a weight percentage of oxygen in the reduced graphene oxide is between 2 and 20%.

4. The coated metallic substrate as recited in claim 1 wherein a concentration of the reduced graphene oxide in the paint is between 0.05 and 10% by weight.

5. The coated metallic substrate as recited in claim 1 wherein the thermosetting polymer is chosen from at least one of the group consisting of: epoxy resin, Polyester resin, Polyurethanes, Polyurea/polyurethane, Vulcanized rubber, Urea-formaldehyde, Melamine resin, Benzoxazines, Polyimides, Bismaleimides, Cyanate esters, polycyanurates, Furan, Silicone resins, Thiolyte and Vinyl ester resins and a mixture thereof.

6. The coated metallic substrate as recited in claim 1 wherein the non-conductive primer is made of at least one polymer.

7. The coated metallic substrate as recited in claim 6 wherein the polymer is chosen from at least one of the group consisting of: Poly(methyl methacrylate), epoxy resin, Polyester resin, Polyurethanes, Polyurea/polyurethane, Vulcanized rubber, Urea-formaldehyde, Melamine resin, Benzoxazines, Polyimides, Bismaleimides, Cyanate esters, polycyanurates, Furan, Silicone resins, Thiolyte and Vinyl ester resins and a mixture thereof.

8. The coated metallic substrate as recited in claim 1 wherein the metallic substrate is chosen from at least one of the group consisting of: aluminum, steel, stainless steel, copper, iron, copper alloys, titanium, cobalt, metal composite or nickel and a mixture thereof.

9. The coated metallic substrate as recited in claim 1 wherein the non-conductive primer is coated with paint strips to form an alternation between painted and non-painted non-conductive primer.

10. The coated metallic substrate as recited in claim 1 wherein the reduced graphene oxide has a surface area below 300 $m^2 \cdot gr^{-1}$.

11. The coated metallic substrate as recited in claim 1 wherein the reduced graphene oxide has a surface area below 290 $m^2 \cdot gr^{-1}$.

12. The coated metallic substrate as recited in claim 1 wherein the reduced graphene oxide has a surface area above 200 $m^2 \cdot gr^{-1}$ and below 290 $m^2 \cdot gr^{-1}$.

13. The coated metallic substrate as recited in claim 1, wherein conductivity of the coated metallic substrate is from $2.1 \times 10^{-7}$ to $1.5 \times 10^{-1}$ S/m.

14. The coated metallic substrate as recited in claim 13, wherein electrical resistance of the coated metallic substrate is between $6.7 \times 10^4$ and $4.8 \times 10^{10}$ Ω/sq.

15. A method for manufacture of the coated metallic substrate as recited in claim 1, the method comprising the successive following steps:
   A. depositing a non-conductive primer on the metallic substrate;
   B. depositing a mixture including the reduced graphene oxide, the thermosetting monomer, a curing agent and optionally a solvent on the non-conductive primer previously deposited on the metallic substrate; and
   C. curing the mixture.

16. The method as recited in claim 15 wherein in step B), the solvent is chosen from at least one of the group consisting of: xylene, n-butanol, ethylbenzene, naphtha, n-butyl acetate, toluene, isopropanol, cyclic hydrocarbons and benzyl alcohol and a mixture thereof.

17. The method as recited in claim 15 wherein in step B), the curing agent is chosen from at least one of the group consisting of: polyamide, phenols, amines and polyaddition isocyanate.

18. A method for detecting a strain deformation with the coated metallic substrate as recited in claim 1, the method comprising the following successive steps:
   applying an electrical voltage to the coated metallic substrate using an electronic system; and
   measuring an electrical resistance variation after deformations of the coated metallic substrate.

19. The method as recited in claim 18 wherein the electronic system includes a power supply system.

20. A coated metallic substrate comprising: a metallic substrate directly coated with a non-conductive primer, the non-conductive primer being at least partially coated on at least one side with a paint including reduced graphene oxide and a thermosetting polymer, wherein the reduced graphene oxide is in a form of one or more nanoplatelets.

21. The coated metallic substrate as recited in claim 20, wherein a concentration of the reduced graphene oxide in the paint is between 0.5 and 4% by weight.

22. The coated metallic substrate as recited in claim 21, wherein a weight percentage of oxygen in the reduced graphene oxide is between 2 and 10%.

23. The coated metallic substrate as recited in claim 21, wherein electrical resistance of the coated metallic substrate is between $6.7 \times 10^4$ and $4.8 \times 10^{10}$ $\Omega$/sq.

24. The coated metallic substrate as recited in claim 20, wherein electrical resistance of the coated metallic substrate is between $6.7 \times 10^4$ and $4.8 \times 10^{10}$ $\Omega$/sq.

25. The coated metallic substrate as recited in claim 20, wherein a gauge factor of the coated metallic substrate is above 5.

26. The coated metallic substrate as recited in claim 20, wherein a lateral size of the nanoplatelets is between 1 and 80 μm.

27. The coated metallic substrate as recited in claim 20, wherein conductivity of the coated metallic substrate is from $2.1 \times 10^{-7}$ to $1.5 \times 10^{-1}$ S/m.

\* \* \* \* \*